(12) United States Patent
Zock et al.

(10) Patent No.: US 11,098,472 B2
(45) Date of Patent: *Aug. 24, 2021

(54) EROSION AND SEDIMENT CONTROL ABOVE GRATE BASED INLET FILTER SYSTEM INCLUDING HIGH TRAFFIC EMBODIMENTS

(71) Applicant: MKB Company, LLC, Groveport, OH (US)

(72) Inventors: Michael A. Zock, Saxonburg, PA (US); Jeffrey Karl Szebalskie, Sr., Mars, PA (US); Nick Dreher, Groveport, OH (US)

(73) Assignee: MKB COMPANY, Groveport, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/574,726

(22) Filed: Sep. 18, 2019

(65) Prior Publication Data

US 2020/0109548 A1     Apr. 9, 2020

Related U.S. Application Data

(63) Continuation-in-part of application No. 16/100,530, filed on Aug. 10, 2018, now Pat. No. 10,704,247, which is a continuation-in-part of application No. 15/449,576, filed on Mar. 3, 2017, now Pat. No. 10,167,620.

(Continued)

(51) Int. Cl.
*E03F 5/04* (2006.01)
*E03F 5/06* (2006.01)
(Continued)

(52) U.S. Cl.
CPC ............ *E03F 5/0404* (2013.01); *B01D 29/05* (2013.01); *B01D 39/1615* (2013.01);
(Continued)

(58) Field of Classification Search
CPC .......... E03F 5/0404; E03F 5/06; B01D 29/05; B01D 39/1615; B01D 39/1623; B01D 2239/0604
(Continued)

(56) References Cited

U.S. PATENT DOCUMENTS 5,575,925 A    11/1996  Logue, Jr.
6,045,691 A    4/2000   McDermott
(Continued)

*Primary Examiner* — Christopher Upton
(74) *Attorney, Agent, or Firm* — Blynn L. Shideler; Krisanne Shideler; BLK Law Group

(57) ABSTRACT

An above grate based inlet filter system for erosion and sediment control comprises a filter mat configured to extend beyond the perimeter of the grate and a securing mechanism, such as magnets, configured to securing the filter mat around the perimeter of the grate. The system may include a filter berm secured in vicinity to the mat, and a rectangular array of magnets coupling the filter mat to the grate. The natural fiber filter mat may effectively be formed of vertically aligned coir fibers or alternatively of reticulated foam. Multiple side edges of the mat are undulating having a pattern of repeating recesses. The mat includes a plurality of high flow holes extending into the mat and which are closed at a bottom surface thereof. The mat includes at least one removable dewatering plug configured to allow for selective mat bypass.

19 Claims, 5 Drawing Sheets

Related U.S. Application Data

(60) Provisional application No. 62/732,765, filed on Sep. 18, 2018, provisional application No. 62/303,619, filed on Mar. 4, 2016.

(51) Int. Cl.
*E03F 5/14* (2006.01)
*B01D 39/16* (2006.01)
*E02B 3/02* (2006.01)
*B01D 29/05* (2006.01)

(52) U.S. Cl.
CPC ..... *B01D 39/1623* (2013.01); *B01D 39/1676* (2013.01); *E02B 3/02* (2013.01); *E03F 5/06* (2013.01); *E03F 5/14* (2013.01); *B01D 2239/0604* (2013.01); *E03F 2005/0414* (2013.01)

(58) Field of Classification Search
USPC ..... 210/163, 164, 170.03, 747.3; 404/2, 4, 5
See application file for complete search history.

(56) References Cited

U.S. PATENT DOCUMENTS

| | | |
|---|---|---|
| 6,059,964 A | 5/2000 | Strawser, Sr. |
| 6,086,758 A | 7/2000 | Schilling et al. |
| 6,093,314 A | 7/2000 | Wilson et al. |
| 6,706,172 B2 | 3/2004 | Strawser |
| 6,808,623 B2 | 10/2004 | Harris et al. |
| 7,070,691 B2 | 7/2006 | Lindemulder |
| 7,201,843 B2 | 4/2007 | Sasaki et al. |
| 7,208,081 B2 | 4/2007 | Jones |
| 7,399,411 B2 | 7/2008 | DeAngelis |
| 7,481,921 B2 | 1/2009 | Kent |
| 8,017,005 B2 | 9/2011 | Ringenbach et al. |
| 8,043,498 B2 | 10/2011 | Rueda |
| 8,051,568 B2 | 11/2011 | Moody et al. |
| 8,216,453 B2 | 7/2012 | Moody et al. |
| 8,679,328 B2 | 3/2014 | Herbert |
| 9,573,086 B2 * | 2/2017 | Corder ............ E03F 5/06 |
| 10,167,620 B2 | 1/2019 | Zock et al. |
| 10,704,247 B2 * | 7/2020 | Zock ............ E03F 5/0404 |
| 2002/0130070 A1 | 9/2002 | Roesner |
| 2002/0130083 A1 | 9/2002 | Middleton et al. |
| 2004/0200767 A1 | 10/2004 | Singleton |
| 2008/0149544 A1 | 6/2008 | Shaw et al. |
| 2008/0296211 A1 | 12/2008 | Swan |
| 2013/0121768 A1 | 5/2013 | Powell |
| 2014/0048465 A1 | 2/2014 | D'Andreta et al. |
| 2016/0040409 A1 | 2/2016 | Powers |
| 2017/0058504 A1 | 3/2017 | Wilkie |
| 2019/0040618 A1 | 2/2019 | Zock |

* cited by examiner

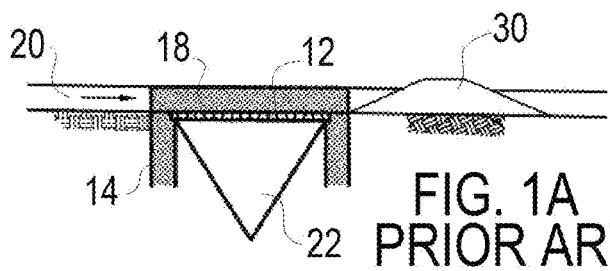
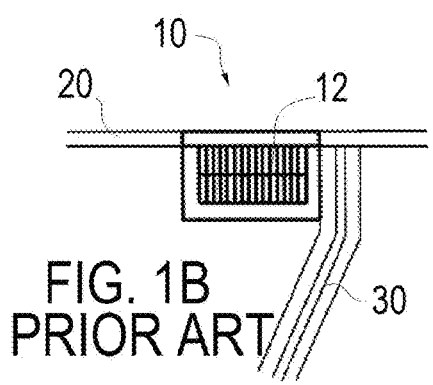
FIG. 1A PRIOR ART
FIG. 1B PRIOR ART
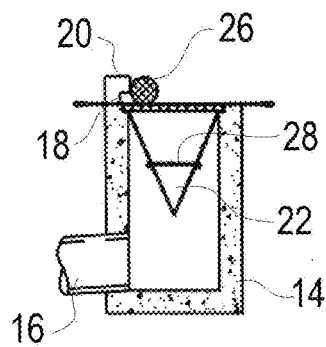
FIG. 1C PRIOR ART
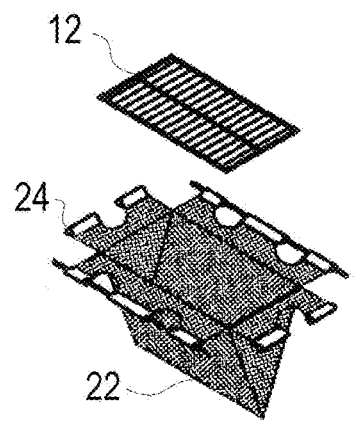
FIG. 1D PRIOR ART
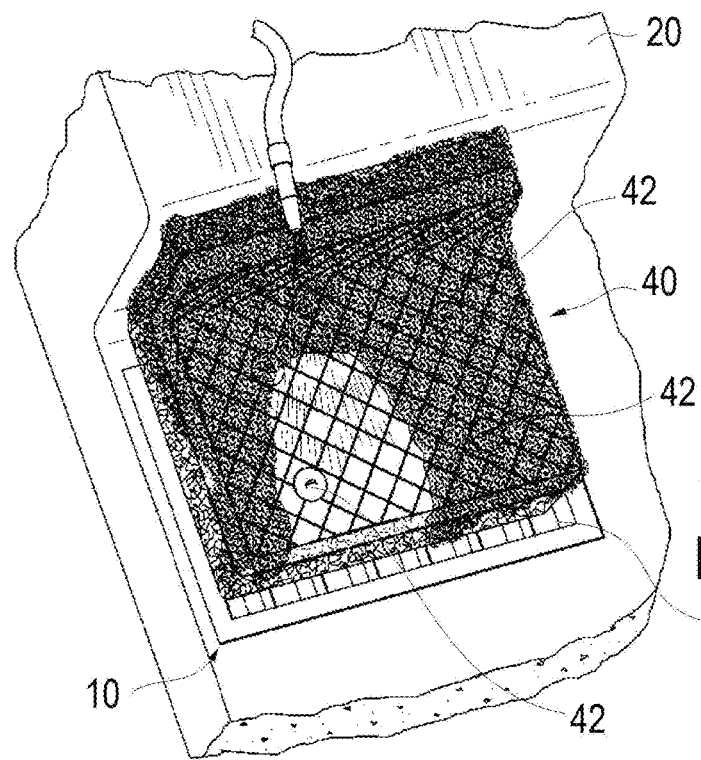
FIG. 2 PRIOR ART

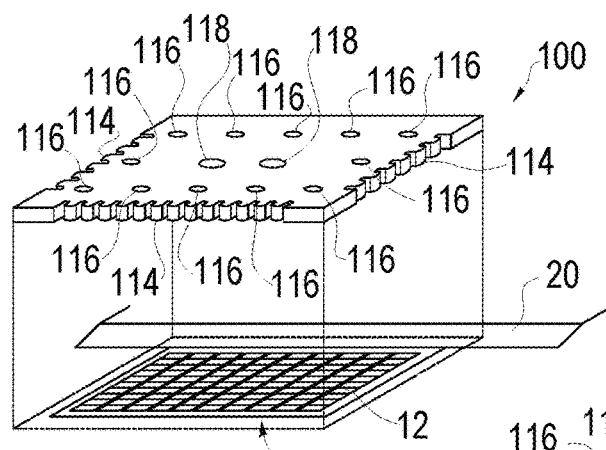
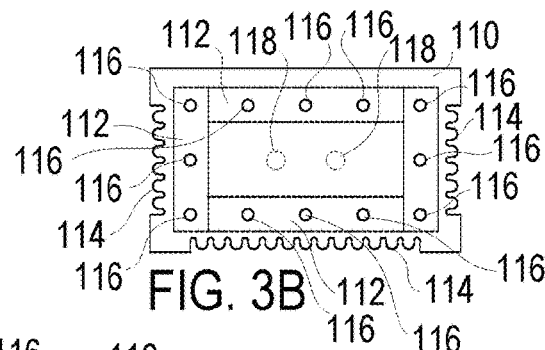
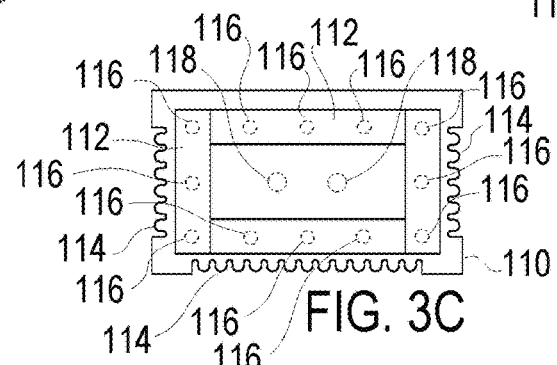
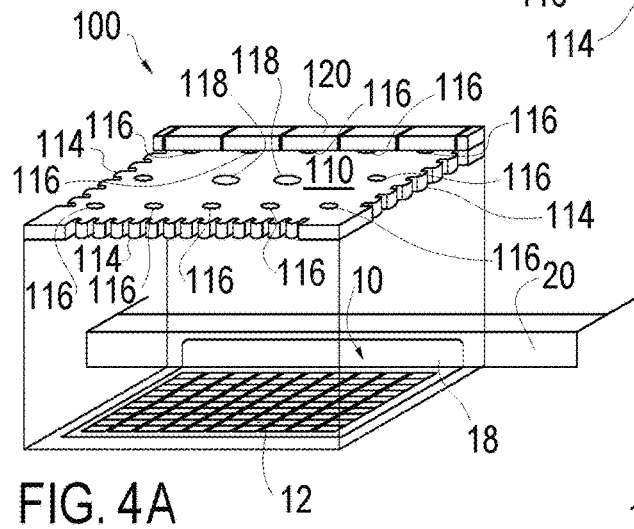
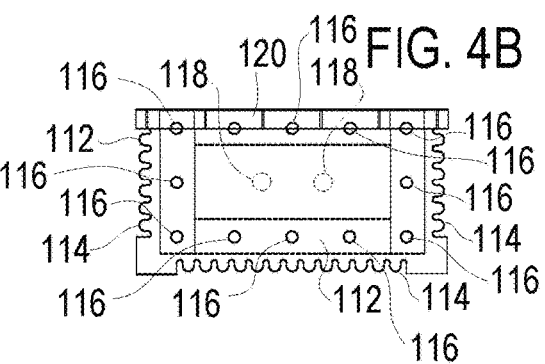
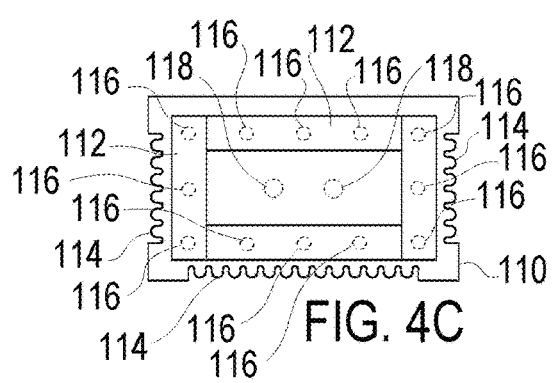

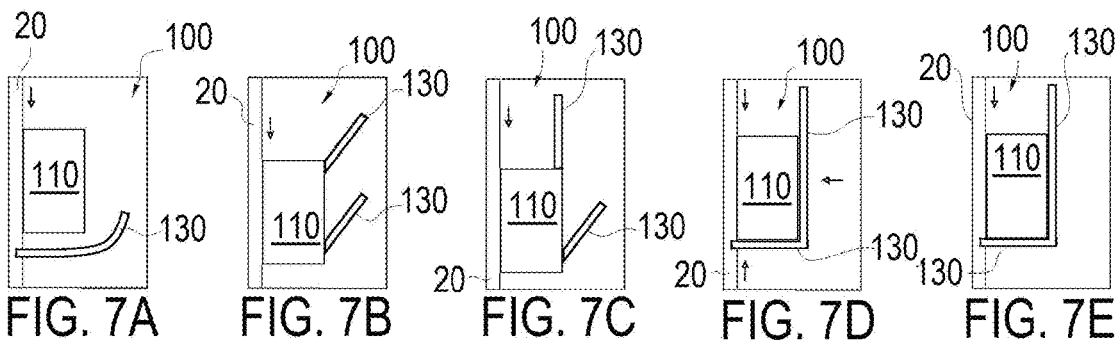
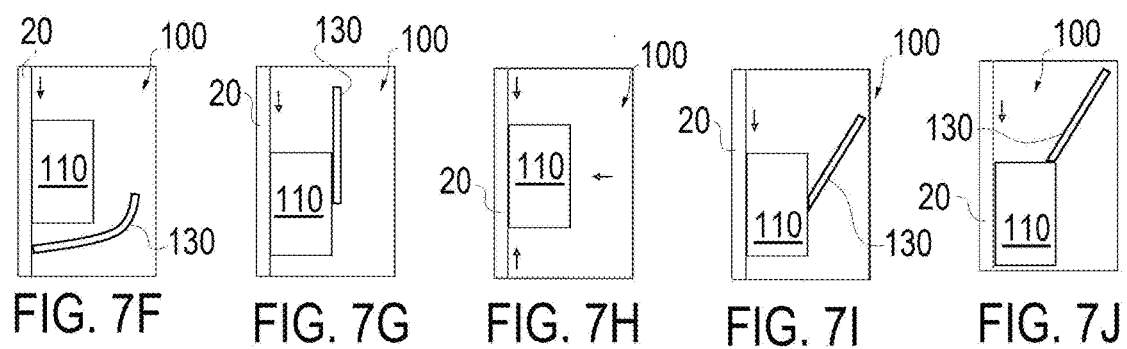
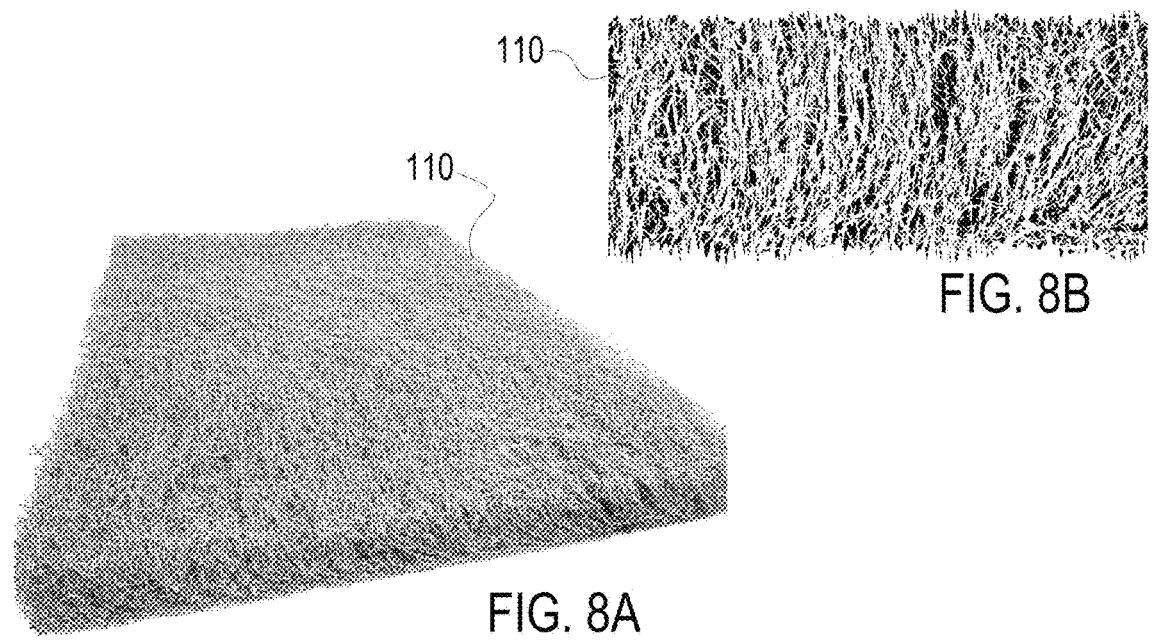

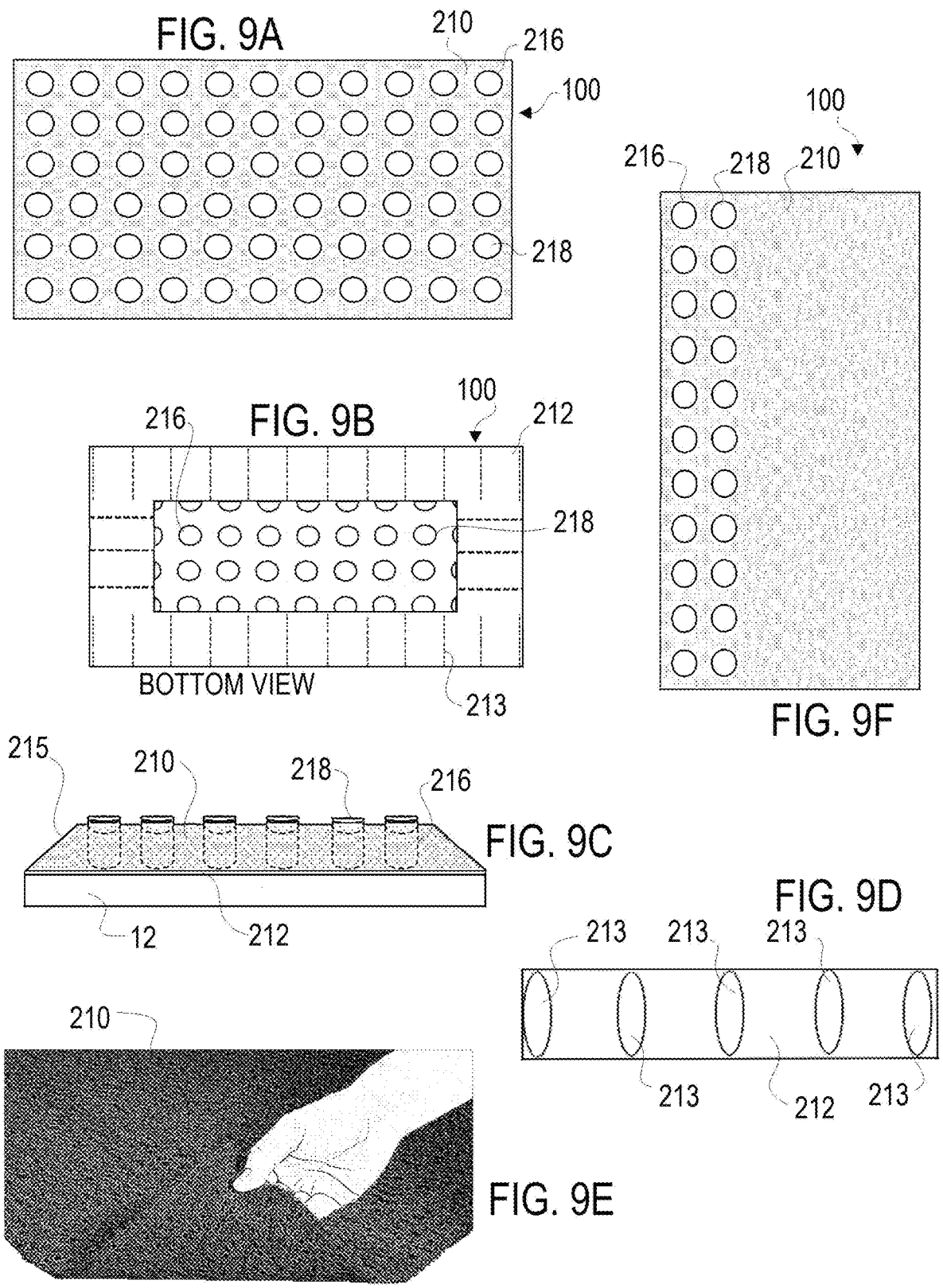

EROSION AND SEDIMENT CONTROL ABOVE GRATE BASED INLET FILTER SYSTEM INCLUDING HIGH TRAFFIC EMBODIMENTS

RELATED APPLICATIONS

This application claims the benefit of application Ser. No. 62/732,765 filed on Sep. 18, 2018.

This application is a continuation-in-part of application Ser. No. 16/100,530 filed on Aug. 10, 2018 and that published Feb. 7, 2019 as publication number 2019-004618.

Application Ser. No. 16/100,530 is a continuation-in-part of application Ser. No. 15/449,576 filed on Mar. 3, 2017 and that published Sep. 7, 2017 as publication number 2017-0254063 and issued Jan. 1, 2019 as U.S. Pat. No. 10,167,620.

Application Ser. No. 15/449,576 claims priority to U.S. Patent Application Ser. No. 62/303,619 filed Mar. 4, 2016, entitled "Erosion and Sediment Control Inlet Grate Filter System."

The above identified applications, patent and publications are incorporated herein by reference in their entirety.

BACKGROUND INFORMATION

1. Field of the Invention

The present invention relates to erosion and sediment control for inlet grates, and more particularly to above grate based inlet filter systems for erosion and sediment control including for high traffic applications.

2. Background Information

The present invention relates to erosion and sediment control filtration system and method finding particular utility in reducing the amount of silt, sedimentation and debris in water entering storm drains via the grate inlets.

In response to tighter guidelines imposed by the federal Environmental Protection Agency (EPA) under the Clean Water Act, additional regulatory attention is being focused on controlling silt and sediment found in storm, construction site and other sources of water runoff.

Various federal and state agencies have issued mandates and developed guidelines regarding the prevention of non-point source pollution. These mandates affect water runoff from storms, construction sites, and other sources. Such laws and regulations have a significant impact on how runoff water may be channeled and diverted, and further on the ways that contractors can dispose of excess or unwanted water from constructions sites. With respect to construction sites, the EPA has established a goal of having developers prevent eighty percent of general contaminants, such as unwanted, site-generated sediment, from entering inlet drains.

One conventional type of inlet drain protection is referenced as a filter bag or "silt sack", which is generally shown in the Pennsylvania Department of Environmental Protection (Pa DEP) manual reproduced in prior art FIGS. 1A-D. A conventional inlet drain 10 includes a grate 12 over a vault or box 14 leading to the drain pipe 16. The inlet drain 10 may also include an above grade curb opening 18 within a curb 20. The conventional silt sack includes a filter bag 22 supported on a frame 24 (generally rebar members) that are held in place by the grate 12 on the box 14. The curb opening 18 may be blocked by a compost filter sock 26 or sand bags.

The bag 22 may include a restraining mechanism 28 (nylon rope) to prevent excessive expansion of the bag 22. Many jurisdictions require an additional curb or berm 30 to be used for below grate bag 22 installations. Other representative examples of the these known drain filter bags, silt sacks or drain inserts is found in U.S. Pat. Nos. 5,575,925, 6,086,758, 6,093,314, 6,059,964, and 6,045,691, and 7,201,843, and 8,017,005, which patents are incorporated herein by reference.

The applicant is involved with erosion and sediment control for the construction industry which has repeatedly seen the challenges of using below grate silt sacks for inlet sediment containment in residential developments during build-out. One of the drawbacks to existing filter bag filtering devices is the time and effort of installing, cleaning and replacing the filter bag filtering systems. Further, in such existing systems silt, sedimentation, mud and other debris can build up quickly, causing the filtering devices to clog. As clogging begins, water flow decreases, which leads to a back-up of excess, unfiltered water. Back-ups may create additional regulatory, environmental, aesthetic and structural problems. Many systems have circumvented back-up of excess water by providing by-pass overflow features; however, while an overflow feature solves the immediate problem, the overflow water remains unfiltered, thereby defeating the primary intent of the filtration device.

When a filtering device's capacity is reduced to the point that it no longer adequately functions, the filter must be removed and either be disposed of or cleaned. Filtration devices can be difficult and time consuming to remove. For example, when a filtration device is attached to the underside of an inlet grate 12, such as bags 22, sediment is collected underneath the grate 12. Thus to change or clean a filter, the inlet grate 12 must first be removed. Next, either the bag 22 must be removed (to be cleaned or disposed of) or the sediment must be removed from the bag 22. Removal of the bag 22 can be difficult, as it may have a large mass of sediment that is very heavy. In this case, removal is at least taxing and time-consuming, possibly cumbersome, and may even require lifting machinery. If the bag 22 does not hold a large volume of sediment, then removal will be more easily accomplished, but such remediation also must be done more frequently. In addition to the constraints and problems associated with cleaning or changing a filtering bag 22, timing also creates a problem. Oftentimes, clogging of filtering devices occurs during periods of heavy water flow, such as seasonal or other flooding periods. This presents an immediate need for cleaning or replacing a filter bag 22 coupled with circumstances that make the task even more difficult, onerous, and time-consuming.

Some have attempted to address the deficiencies of the prior art with primarily above grate filter systems. Such systems also may be referenced as above grade, but the phrase "above grate" is more accurate. One example is disclosed in U.S. Pat. No. 7,481,921, which is incorporated herein by reference. The '921 patent teaches the use of a randomly aligned coir fiber filter member 40 formed preferably of two generally 1 inch high filtering segments secured to the grate 12 via a plurality of zip-tie or cable-tie members 42. This is generally shown in FIG. 2.

Coir is a natural fiber extracted from the husk of coconuts used in a variety of products such as floor mats, brushes, mattresses, etc. Specifically, coir is the fibrous material found between the hard, internal shell and the outer coat of a coconut. The '921 patent teaches a primary filter of portion having a described preferable density between "3 oz./sq. ft. (sic) and 4.5 oz./sq. ft. (sic)", and a secondary filter of portion having a density preferably between "4 oz./sq. ft. (sic) and 6 oz./sq. ft. (sic)". U.S. Pat. No. 8,043,498, which is incorporated herein by reference, discloses a curb inlet storm drain protector. The '498 patent discusses the '921 patent device and has noted that "although the [921 patent] apparatus [40] succeeds in preventing the passage of sediment and small debris that would otherwise bypass the grating [12], it is likely that such a fibrous mat would need to be continuously cleaned and would quickly clog in high flow situations or if left untended for any significant period of time. Moreover, the [921 patent] apparatus [40] provides no method of filtering liquid contaminants, such as motor oil, that may commonly find their way to storm drains [10]." U.S. Patent Publication 2008-0296211, which is incorporated herein by reference, also teaches the use of a randomly aligned coir fiber filter member formed preferably of two generally 1 inch high filtering segments secured to the grate via a plurality of zip-tie or cable-tie members, and the '211 publication seems largely to follow the teachings of the '921 patent.

The '498 Patent discloses a curb inlet storm drain protector having: a first, top layer comprising a generally horizontal surface having a plurality of holes formed therein, and a plurality of substantially vertical projections emanating from said horizontal surface, wherein said holes allow passage of water vertically through said first layer, and wherein said vertical projections extend a height sufficient to prevent passage of debris across said top layer while permitting passage of water over said horizontal surface, thereby preventing the drain inlet from being clogged; a center layer composed of a screen or mesh having apertures of approximately one-eighth inch or greater in diameter; and a third layer composed of a felt material having hydrophobic properties; wherein said first, second and third layers are fastened together and act as a single barrier that is coextensively laid over said grate.

U.S. Pat. Nos. 8,051,568 and 8,216,453, which are incorporated herein by reference, disclose storm water grate covers for attaching over a storm water grate. The grate covers include an expanded metal screen sized to fit over the storm water grate; a U-shaped edge trim having a plurality of barbs thereon; a high flow monofilament fabric filter sized to fit over the expanded metal screen and being attached to said expanded metal screen; and a plurality of bolts attaching the expanded metal screen and monofilament fabric filter to said storm water grate.

U.S. Publication 2002/0130070 which is incorporated herein by reference, disclose storm water grate cover filter pads formed of an outer bag or shell containing an inner filter matrix filtering material.

U.S. Publication 2008/0296211 which is incorporated herein by reference, discloses a storm water grate cover filter mat formed of natural or synthetic fibers using zip-ties (aka cable ties) for coupling to the grate.

U.S. Pat. No. 6,706,172 which is incorporated herein by reference, discloses a storm water grate cover filter mat formed of a woven mesh within a rubber open frame.

U.S. Pat. No. 8,676,328 which is incorporated herein by reference, discloses a floor drain cover that has a frame and screen that is used to separate debris captured on the screen from water flowing to the drain through apertures in the side of the frame.

U.S. Patent Publications 2002-0130083 and U.S. Pat. Nos. 7,070,691, 7,399,411 and 8,017,005 are also of general interest in the above grate filter fields.

Above grate filter systems occasionally need to be designed for "high traffic" areas. Areas of "high traffic" are a relative term when applied to inlet grates. Very few inlet grates are designed in areas that routinely see traffic directly over the inlet grate. They are designed to typically at the side of the road and generally only receive occasional traffic directly over the inlet. Thus typical above grate systems must withstand an occasional vehicle passing over the system without detrimentally effecting the system. However, in those areas that receive more than the occasional vehicle over the inlet are considered high traffic, and any system must accommodate high traffic. For reference a conventional above grate system can show wear and damage after a thousand or a few thousand or so passes by a vehicle (even as few as a few hundred), however an above grate filter system for a high traffic location must withstand at least 5000 and generally 10,000+ vehicle passes without detrimental effects on operation.

Accordingly, there exists a need for better devices, systems and methods for filtering sediment from water entering storm drains, specifically those which provide ease of installation; can be easily cleaned or changed, even during periodic flooding; prevent unwanted back-up of excess water; filter nearly all or all of the water that comes through the inlet; and are cost effective.

SUMMARY OF THE INVENTION

The invention, in one embodiment, is directed to an above grate based inlet filter system for erosion and sediment control comprising a filter mat configured to extend beyond the perimeter of the grate, a securing mechanism configured to securing the filter mat around the perimeter of the grate, and wherein the mat includes a plurality of high flow holes extending into the mat from a top surface thereof and which are closed at a bottom surface thereof.

The invention, in one embodiment, is directed to an above grate based inlet filter system for erosion and sediment control comprising a filter mat configured to extend beyond the perimeter of the grate, a securing mechanism configured to securing the filter mat around the perimeter of the grate, and wherein multiple side edges of the mat extending from a top surface of the mat to a bottom surface of the mat are undulating having a pattern of repeating recesses.

The invention, in one embodiment, is directed to an above grate based inlet filter system for erosion and sediment control comprising a filter mat configured to extend beyond the perimeter of the grate, a securing mechanism configured to securing the filter mat around the perimeter of the grate, wherein the mat includes at least one removable dewatering plug configured to allow for selective mat bypass.

The invention in one embodiment provides an above grate based inlet filter system for erosion and sediment control comprising a high traffic filter mat formed of looped vinyl strands configured to be coupled to a grate, magnets configured to securing the filter mat to the grate, and at least one flow hole extending into the mat from a top surface thereof.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE FIGURES

FIG. 1A is a schematic side sectional view of a conventional filter bag installation for an inlet drain;

FIG. 1B is a schematic plan view of the conventional filter bag installation of FIG. 1A;

FIG. 1C is a schematic end sectional view of the conventional filter bag installation of FIG. 1A;

FIG. 1D is a schematic exploded perspective view of the conventional filter bag installation of FIG. 1A;

FIG. 2 is a schematic perspective view of a known above grate based filter system installation for an inlet drain;

FIG. 3A is a schematic exploded view of an above grate based inlet filter system installation for an inlet drain according to one embodiment of the present invention;

FIG. 3B is a schematic top plan view of the above grate based inlet filter system installation of FIG. 3A;

FIG. 3C is a schematic bottom plan view of the above grate based inlet filter system installation of FIG. 3A;

FIG. 4A is a schematic exploded view of an above grate based inlet filter system installation for an inlet drain according to another embodiment of the present invention;

FIG. 4B is a schematic top plan view of the above grate based inlet filter system installation of FIG. 4A;

FIG. 4C is a schematic bottom plan view of the above grate based inlet filter system installation of FIG. 4A;

FIGS. 7A-J are schematic plan views illustrating representative filter berm placement in the above grate based inlet filter system installation according to the invention;

FIGS. 8A-B are enlarged sectional views illustrating the vertical coir fibers in the above grate based inlet filter system installation according to the invention; and FIG. 9A is a schematic top plan view of an above grate based high traffic inlet filter system installation for an inlet drain according to another embodiment of the present invention;

FIG. 9B is a schematic Bottom plan view of the above grate based high traffic inlet filter system installation of FIG. 9A;

FIG. 9C is a schematic side view of the above grate based high traffic inlet filter system installation of FIG. 9A;

FIG. 9D is an enlarged schematic top plan view of magnets and glue lines used in the above grate based high traffic inlet filter system installation of FIG. 9A;

FIG. 9E is a schematic perspective view of spaghetti matting forming the above grate based high traffic inlet filter system installation of FIG. 9A; and FIG. 9F is a schematic top plan view of a modified form of the above grate based high traffic inlet filter system installation for an inlet drain of FIG. 9A.

DESCRIPTION OF THE PREFERRED EMBODIMENTS

Figure 5A:
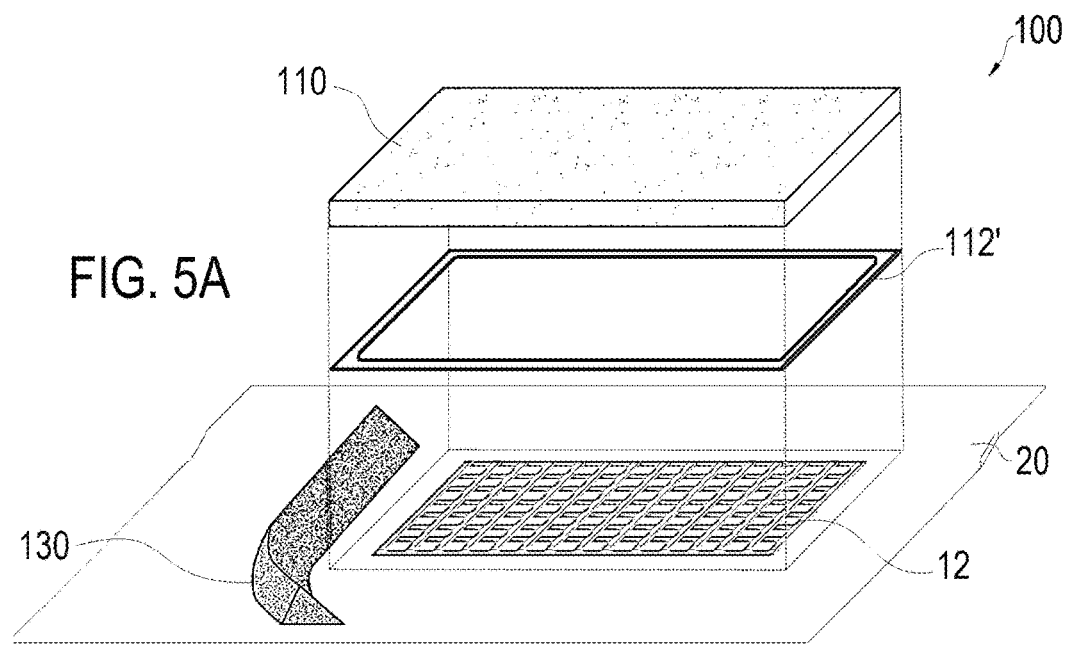
FIG. 5A is a schematic exploded view of an above grate based inlet filter system installation for an inlet drain according to another embodiment of the present invention.

As shown in the FIGS. 1-8 the present claimed invention yields an above grate based inlet filter system 100 for erosion and sediment control comprising a filter mat 110 generally extending beyond the perimeter of the grate 12 of the inlet drain 10, a securing member such as magnets 112 or double sided tape 112' (shown in the embodiment of FIGS. 5A-B) securing the filter mat 110 completely around the perimeter of the grate 12, and optionally a filter berm 130 secured in vicinity to the mat 110 (such as by double sided tape securing the filter berm 130 in position).

The filter mat 110 of the present invention can be formed of a variety of known materials, however expanded foam and natural fibers represent two preferential materials for the filter mat 110 of the present invention. Natural fibers within this application preferentially consist of coir fibers and fibers of jute, cotton, hemp and empty fruit bunches.

The erosion and sediment control filter system 100 according to one embodiment of the invention preferably utilizes a unique coir fiber filter mat 110 described in detail below. It is preferred that the coir fiber filter mat 110 extend beyond, generally at least three inches beyond, the inlet opening of the grate 12 to provide a minimum of 2" water travel for water to enter the grate 12. This overlap should be generally on all "open" sides of the grate 12, meaning those sides of the grate 12 not adjacent a curb 20 (or opening 118 in such curb). As shown herein, with a curb 20 present the filter mat 110 extends up to the curb 20.

FIG. 3A-C illustrate the details of an above grate based inlet filter system 100 for an inlet drain 10 according to one embodiment of the present invention. The filter system 100 for erosion and sediment control comprises a natural fiber filter mat 110, the construction of the fibers of which are discussed below. The filter mat 110 extends beyond the inlet opening of the grate 12 on three sides and the filter mat 110 will butt against the curb 20.

Prior to installation the inlet grate 12 surface and surrounding area should be cleaned and cleared and the mat 110 installed with at least 2" clearance on the three open sides with the straight edge of the mat 110 adjacent the curb 20. The filter mat 110 includes four flexible magnetic sheets or magnets 112 glued to the undersurface of the filter mat 110 and forming a mechanism for attachment around the entire periphery of the steel grate 12. Each magnetic sheet 112 is a flexible member about 6" wide and may be effectively formed of a compound of neodymium (Nd) forming extremely strong permanent magnets. Neodymium magnetic sheet material is available from a number of manufacturers.

The open sides of mat 110 (those not facing the curb 20) includes an undulating edge 114, scalloped in this example, formed to increase the effective surface area through which water may flow through. Undulating in this context merely means a non-linear edge shape increasing the surface area of the edge as compared to a straight edge. A scalloped pattern of semicircular or oblong recesses is shown but other undulating patterns of repeating recesses (or projections) are easily contemplated, such as a saw-tooth pattern, a pattern of repeating rectangular recesses, a repeating dovetail recess opening pattern, and combinations thereof. The undulations increase the side edge surface area by at least 25% and typically about 40% and increase the operational flow rate of the filter mat 110 and increases the sediment capture of the mat 110 accordingly, as the majority of water will flow through the filter mat 110 into the grate 12 through the side edges of the filter mat 110. The closed side of the mat, the one facing the curb 20, is not undulating so the closed side edge of the mat 110 can be maintained in close proximity to the curb 20.

The mat 110 includes high flow holes 116 through the mat 110 in locations aligned with the magnets 112. The magnets 112 act to cap the bottom of the high flow holes 116. Thus in periods of high flow, water may be expected to flow over the top of the filter mat 110 and through the mat 110 at locations other than through the side edge. Water reaching the high flow holes 116 can flow into the holes 116 and then into the mat 110 and through the grate 112. The high flow holes 116 increase the operational capacity of the mat 110 and the system 100. The holes 116 are preferably 2 inches in diameter and centered on the underlying 6" wide magnet 12 such that water entering the mat 110 via openings 112 will travel at least 2 inches laterally through the mat 110, similar to the water at the outer edges of the mat 110. Ovals, rectangles or a variety of shapes may also easily form the holes 116.

The mat 110 includes emergency dewatering plugs 118, which here are merely circular plugs cut out of the mat 110 and thus formed out of the same natural fiber material as the mat 110. The plugs 118 act as a manual filter bypass and can be used when needed to rapidly remove water above the grate 112 (without filtering). One or both plugs 118 may be left out to prevent water buildup above the grate 12. The plugs have been formed as 3 inch diameter cylindrical plugs, but a number of shapes and sizes would work equally well. With one or both plugs 118 removed, in periods of very high water flow, water flowing over the mat 110 and reaching the open plugs 118 will move into the grate 112 bypassing the filtering of the mat 110. The fibrous nature of mat 110 allows these plugs 118 to be merely cut out and retained by friction or interference fit with the adjacent fibers. Alternatively a large opening retaining mesh (e.g. 1" openings) could optionally be glued to the underside of the mat 110 overlapping the opening formed by the plugs 118 to prevent the plugs 118 from being inadvertently pushed through the mat 110 and through the grate 12.

System for Drain with Curb and Curb Opening

The erosion and sediment control filter system 100 provides a coir fiber filter mat 110 which is a 32"×54" mat which is more than sufficient for a conventional inlet grate with adjacent curb 20. The curb 20 often may have a curb opening 18 entering the box 14 as shown in FIG. 4A and FIGS. 1A-D. In such a circumstance the filter mat 110 of FIGS. 3A-C may be bent at a right angle and extend up the curb 20 and cover the opening 18 and then bent 90 degrees to be coupled to the top of the curb 20, essentially treating the opening 18 as part of the inlet grate 12 in the present system. Alternatively the mat 110 could merely butt against the curb 20 and the opening 18 in the curb 20 could be filled with a portion of a foam filter berm 130 on top of the mat 110 or, alternatively, with a conventional compost filter sock on top of the mat 110, similar to the use of such socks with silt sacks shown above. More preferably, FIGS. 4A-C schematically show an above grate based inlet filter system 100 designed specifically for the inlet drain 10 with the curb opening 118. This embodiment of system 100 is the same as described above in connection with FIGS. 3A-C except for the inclusion of a blocking member 120 formed by another layer of mat material glued or otherwise coupled or formed integral to the top surface of the underlying mat 110 and configured for forming an barrier in front of curb opening 118. The blocking member 120 is shown extending to but not completely covering the high flow openings 116 on the curb or closed side of the mat 110. The blocking member 120 prevents or at least minimizes the flow of water and sediment into the box 14 without going through the fibrous filtering material of the mat 110.

Systems with Non-Magnetic Grate Coupling

Figure 5B:
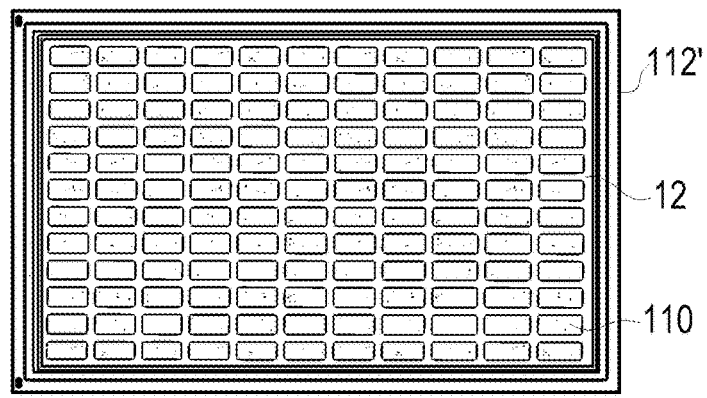
FIG. 5B is a schematic bottom plan view of the above grate based inlet filter system installation of FIG. 5A.
Figure 6:
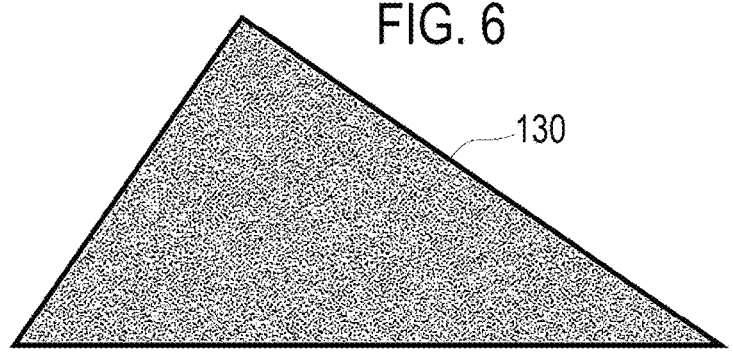
FIG. 6 is a schematic sectional view of a filter berm of the above grate based inlet filter system installation according to the invention.

FIGS. 5A-B are schematic views of an above grate based inlet filter system 100 for an inlet drain 10 according to another embodiment of the present invention. The undulations 114, high flow holes 116 and bypass plugs 118 are omitted for clarity. Here the mat 110 is sealed around the grate 12 through the use of double sided butyl tape 112' which is a rubber-based tape that is commonly used for outside work in the construction and roofing industries and contains no harmful VOCs. In this embodiment the tape 112 must be sufficiently wide to close off any high flow opening 116, and the high flow openings 116 must be aligned with the tape 112' in the same manner as they are aligned with the magnets in earlier embodiments. This tape 112' handled the hot and cold, wet and dry, and if it remains after deinstallation, the tape integrates into the asphalt street without being unsightly. The magnets 112 leave no residue and have the less environmental impact.

Prior art zip ties yield unfiltered water pathways or minimal filtered pathways between the ties. The sealing mechanisms of the present invention provide a seal around the entire periphery of the grate 12 minimizing or eliminating unfiltered pathways. A caulking or sealing adhesive (e.g., silicone sealant) could be used to form the sealing periphery connection between the mat 110 and the grate 12 of the drain 10, but the magnets 112 and also the double sided tape 112' are both easier to implement and environmentally preferred.

Filter Berm

The erosion and sediment control filter system 100 according to the present invention optionally uses a 100% reticulated, at least 3 inch tall triangular polyether foam filter berm 130 anchored in place with appropriate adhesive such as via 2-sided butyl tape. This optional berm 130 is shown in FIGS. 4A, 6 and 7A-J and provides filtering, sediment collection, and inlet backflow. The berm 130 can safely be driven over numerous times (automobiles and or construction equipment) for months in the field. The berm 130 won't rot from being wet, will resist UV, and will "snap back" from being squished thousands of times while installed. The berm 130 can be placed in several positions in relations to the filter mat as shown in FIGS. 7A-J depending generally upon the contour of the ground. The filter berm 130 of the system 100 can also be field cut, with a conventional utility knife, to allow for various desired configurations, with the goal be to either direct additional water toward the high end of the filter mat 110, to cradle water allowing low end "backflow" and sediment collection, or both. For more robust or reinforced berm 130 designs, see U.S. Publication 2013/0121768, which designs are incorporated herein by reference.

The positioning of the filter berm 130 will depend upon the slope and contour of the terrain and the acceptable variations are known to those of ordinary skill in the art. As shown in one example of FIG. 7H the berm 130 may be omitted where flow is being received from all three sides of the grate 12 (not the curb 20 side).

Coir Fiber Mat

The natural fiber mat 110 of one embodiment of the present system is a preferably a coir fiber mat held together by a water-based latex binder. Coir fiber storm water inlet filter mats in general have been in the US market since 2008, and by at least 2016 have specific BMP approval in at least Idaho, Oregon, New York, and New Mexico. Appropriate manufacturers of coir fiber mats 110 include Blocksom & Co in Michigan City Ind.

In addition to the above description of the features of the mat 110, there are several additional critical distinctions between the mat 110 of the present invention and those inlet protection coir fiber mats of the prior art. First the fiber mat 110 of the invention is 33% thicker than conventional prior art commercially known coir fiber mats for storm drain protection, namely the present mat 110 is at least 2 inches thick. Additionally the density of the fibers of the present mat is preferably at least 35 ounce/cubic ft and distinct form the known mats in the field. Further the coir fiber mat 110 is designed specifically to extend beyond the inlet grate 12 on open sides thereof and to be sealed around the perimeter of the inlet grate 12 via magnets 112 or tape 112'.

The present development may utilize color in the latex binder to provide a desired color to the mat 110. Aside from branding opportunities of a unique color, the color of the mat 110 (other than typical brown of fibers) can be used as a visual indicator to improve operation. An easily visible blue, for example, can allow for more rapid spot checking of the units by operators as it is easier to spot when blue mats 110 are completely covered with sediment and detritus and thus need serviced. Additionally such color has the effect of making the inlet drain 10 more visible at the construction site.

The desired thickness and density for the mat 110 are achievable and yield the requisite flow through the use of a flat or unidirectional fiber orientation, namely what is known as a vertical orientation or vertically aligned coir fibers as shown in FIGS. 8A-B. The mat 110 may be effectively formed by having the coir fibers, i.e. the coconut husk fibers, in a vertical alignment held together by a water-based latex binder (with optional coloring, with light or bright blue being preferred) coupled to a mesh scrim of backing layer. The vertical orientation of the fibers requires the use of a distinct manufacturing process than random or curled fibers used in the prior art storm drain coir filter mats.

The coir mat 110 of the present invention can be described or classified as a specified subset or species of composite fiber constructions namely as a unidirectional, continuous fiber reinforced single layer structure. Composites are broadly categorized as fiber reinforced or particle reinforced, with the present mat 110 being an example of a fiber reinforced substrate. Further, under the fiber reinforced categorization there are single layer structures and multi-layer structures, and the mat 110 as shown is a single layer component. Under the single layer categorization there are continuous fiber reinforced products and discontinuous fiber reinforced (e.g., random or curled) products, and the present mat 110 is an example of a continuous fiber reinforced structure. Finally under the continuous fiber reinforced structure there are unidirectional and bi directional (e.g. woven) configurations and the mat 110 as described is a unidirectional product.

Expanded Foam Mat

The expanded foam mat 110 of one embodiment of the present system may be easily formed as shown above in FIGS. 3A-C or 4A-C. Preferably the expanded foam mat 110 is formed as a 100% reticulated polyether foam. In this embodiment the plugs 118 would also be formed of expanded foam in the same manner as the mat 110. The remaining aspects of the system are as described above.

Inlet Filter Maintenance

The inlet filter mat 110 will collect sediment in use. The system 100 allows for the users to clean the inlet filter mat 110 while it remains mounted on the grate 12, even if ponded water surrounds the inlet drain 10. This feature ensures substantially all water entering the grate 12 is filtered, except where the bypass plug(s) 118 are in use (i.e. removed). For maintenance the user need only sweep sides and top of inlet filter mat 110 to remove sediment and debris after each rain event. The sediment can be easily manually removed to complete the maintenance and the system 100 is ready for the next rain event. There is no need for additional lifting equipment. The mat 110 of the system 100 will visibly show street cleaning/sediment removal and inspection after every rain event and/or weekly. The system 100 should be periodically inspected as part of the maintenance and the inspection will include verifying the mat 110 and berm 130 (if present) are secure to the grate 12 and road, respectively, and that the mat 110 is not full of sediment, and that the mat 110 is not punctured, torn or highly compressed.

High Traffic Inlet Filter System

The system 100 of the embodiment of FIGS. 9A-F shows embodiments of the present invention designed for high traffic areas. In these embodiments, the above grate based inlet filter system 100 for erosion and sediment control comprising a heavy duty filter mat 210 designed for supporting high traffic. One configuration of the mat 210 is forming the mat 210 as a PVC "spaghetti mat" also known as looped vinyl mats without backing to allow water flow there through. The mat 210 incudes extruded stands of PVC material bonded together in random looping patterns. A heavy duty outdoor looped vinyl mat without backing is generally sufficient to form the mat 210 and is shown schematically in FIG. 9E.

Unlike the mat 110 above the heavy duty mat 210 is generally sized to the grate 12 although it is possible to design the mat 210 to extend beyond the perimeter of the grate 12 of the inlet drain 10. The mat 210 may be sized to the grate 12 because of the difference in the fundamental function of the mat 210 compared with the operation of the mat 110 above. The mat 210 is configured to provide heavy duty traffic support to the system 100 and it does not require, nor is designed for, horizontal movement of water through the material of the mat 210 for filtering as found in the mat 110 described above. Vertical water flow through, primarily, through the plugs 218 filling flow holes 216, and to a lesser extent through the material of the mat 210, is the filtering mechanism.

The system 100 using the mat 210 includes a securing member such as magnets 212 (high energy rubberized magnets 212) securing the filter mat 210 to the perimeter of the grate 12, and optionally may use a filter berm 130 as described above secured in vicinity to the mat 210 (such as by double sided tape securing the filter berm 130 in position). Unlike the mat 110 described above, water reaching the bottom of the flow holes 216 need not be directed horizontally through the material of the mat 210 for filtering as the filtering through the plugs 218 is sufficient. Thus the attachment of the magnets 212 to the mat 210 is through high strength glue in spaced lines 213 with gaps there between. The gaps between the lines 213 of glue allow horizontal flow of water at the base of holes 216 that are on top of the magnets 212.

The filter mat 210 of the present invention preferably includes beveled edges 215 to facilitate vehicle traffic.

The mat 210 is covered with an array of flow holes 216 there through with each of the flow holes 216 filled with a filter or filtering plug 218. The filter plugs 218 are preferably formed of 100% reticulated expanded polyether foam similar to mat 130 discussed above. Alternatively the plugs may be formed of coir fiber such as used to form the mat 110 described above. The filter plugs 218 within flow holes 216 provide the primary filtering mechanism, while the mat 210 primarily provides the structural support in a high traffic area. The mat 210 does provide some flow through and some filtering, and of course the plugs 218 provide some structural integrity to the system 100, however the primary function of the mat 210 is structural and the primary function of the plugs 218 is filtering and flow. The plugs 218 may be glued in. Additionally the holes 216 may be slightly frusto-conical (less than a 10 degree taper getting smaller toward the top) with an analogous shape to the plugs 218 preventing, or at least minimizing, the plugs 218 from being pulled out of the holes 216 (in addition to the securing glue). An array of circular openings or holes 216 with plugs 218 are shown, but any desired shape may be used, such as ovals, squares, triangles, etc. The circular shape is likely the easiest and may yield some structural advantages.

FIG. 9F is a modified version in which the array of holes 216 with filter plugs 216 are only on one side of the mat 210. This configuration is appropriate where the area of the mat 210 without the holes is in the high traffic pattern area—namely it is the part of the mat 210 being driven over. The array of holes 216 may be adjacent the curb in the typical implementation of this embodiment.

SUMMARY

The system 100 of the present invention meets current performance requirements, especially related to hydraulic flow rate and sediment removal rate. The system 100 reduces the likelihood of street flooding as compared with current inlet silt sacks 22 which are prone to blockage during heavy sediment load. The design of the system 100 doesn't require a skidsteer/backhoe to install and maintain, as do systems requiring lifting of the grate 12, and this reduces the initial installation costs and reduces the maintenance and periodic sediment removal costs.

The system 100 with mat 110 is primarily intended for non-major paved roads (such as residential developments). Flooding the roadway at a low point is to be avoided and therefore, water flow bypassing inlets on an inclined roadway is to be avoided (Low-side "back flow" berm 130 is required). The system 100 with mat 210 is primarily intended for paved roads and high traffic areas. The system 100 is configured to stop all "coarse sand" or material not passing a US Standard Mesh Size No. 40 sieve. According to AASHTO "coarse sand" is material passing a No. 10 sieve but retained on a No. 40 sieve; and fine sand is material passing a No. 40 sieve but retained on a No. 200 sieve (Material larger than 0.42 mm size). The system 100 is easy to inspect and service periodically and after rain events.

The system 100 formed of coir fiber as described is "Green-centric" as it is made substantially from recycled/recyclable and/or biodegradable materials.

The system 100 has yielded a viable, serviceable, and re-usable system 100 effective for at least 6 major rain events and/or at least 3 months of operation. The system 100 should be monitored for internal sediment buildup, puncture or tearing, and secured positioning fully covering the inlet grate. The users can replace as needed or every three months. The above grate system 100 is considered a near-flat compressible, but will spring back after compression during the entire product life. Further the mat 110 and berm 130 components of the system 100 are "colorable" for safety and/or product identification.

The system 100 described above (the 32"×54" rectangular mat) would be specific to the conventional 2'×4' inlets, which is the most common inlet structure for residential developments. However other sizes may be manufactured as appropriate. For example a size and configuration with four undulating side 114 for grates that may have four open sides (middle of a parking lot) may be provided. Further another version with two adjacent open sides having undulations and two adjacent straight sides where the grate 12 is in a "closed" corner of an intersection of two roads and orthogonal curbs 20.

Field testing of the system 100 of the present invention yielded exceptionally promising results. At the trial homebuilder developments, street flooding was eliminated in use of the system 100 with foam mat 110 on the inlet grates 12 while sediment was easily collected and removed in a workman-like fashion. The Storm sewer inlet protection system 100 of the present invention reduces the likelihood of street flooding, which is historically a problem with silt sacks 22. The total lifecycle cost of the system 100 of the present invention is less than currently available commercial silt sacks 22 and the system 100 features a biodegradable coir filtration mat 110. This system 100 is particularly well suited to replace silt sacks 22 during the non-winter months of the year in non-heavy highway site work, especially residential construction.

System Testing—Engineering Testing—Astm D7351

The ASTM D7351 test procedure was conducted to assess the level of compliance of the system 100 and natural fiber version mat 110 to the PA DEP specification. The 7351 test demonstrates the superior sediment retention when sediment laden water flows horizontally towards to the inlet filter mat 110 of the invention with the inlet filter mat horizontally installed over the catch basin or grate 12 in accordance with the present invention. In this test sediment both settled along the outside perimeter of the inlet filter mat 110 and was captured within the fibrous mass of vertically aligned coir fibers of the filter mat 110. As sediment builds up along the perimeter and within the fibrous mass, the hydraulic flow rate decreases and the sediment removal rate will increase.

The Test Parameters: 4000 lbs. water, 6% PA "real world" PA sediment load (240 lbs.), 30 minutes water flow. Targeted Particulate (TP): Particulate not passing a no. 40 sieve—or—larger than 0.42 mm in size The following results demonstrate the TP passing through the Inlet Filter Mat 110 of the invention. Additionally the testing has calculated the general hydraulic flow rate. The following ASTM D 7351 testing results evidence the advantages of the system of the present invention:

SRD/Setup: Diamond Sock Inlet Filter System (IFS) & 6% Sediment Concentration
Water/Soil Input/Duration: 3760 lbs water 240 lbs soil 90 minutes
Seepage Effectiveness: 68.15%
Soil Retention Effectivness: 91.88%
Coarse Soil Retained: Less than 0.001% of particles ≥ US Sieve No. 40 passed through the device

| Sediments | Sample ID | Associate Total Sediments, lbs | Total Dry Wt of Sample, g | Dry Wt. of Sample > #40, g | Dry Wt. of Sample > #40, lb | Percent of Total Sediments > #40 | Dry Wt. of Total Sediments > #40, lbs | % of Sediments > #40 in Effluent |
|---|---|---|---|---|---|---|---|---|
| Influent (Upstream) | — | 240.00 | — | — | — | 26.50% | 63.6000 | — |

SRD/Setup: Diamond Sock Inlet Filter System (IFS) & 6% Sediment Concentration
Water/Soil Input/Duration: 3760 lbs water 240 lbs soil 90 minutes
Seepage Effectiveness: 68.15%
Soil Retention Effectivness: 91.88%
Coarse Soil Retained: Less than 0.001% of particles ≥ US Sieve No. 40 passed through the device

| Sediments | Sample ID | Associate Total Sediments, lbs | Total Dry Wt of Sample, g | Dry Wt. of Sample > #40, g | Dry Wt. of Sample > #40, lb | Percent of Total Sediments > #40 | Dry Wt. of Total Sediments > #40, lbs | % of Sediments > #40 in Effluent |
|---|---|---|---|---|---|---|---|---|
| Effluent (Downstream) | A0 | 2.83 | 1.56 | 0.0078 | 0.0000 | 0.0011% | 0.0000 | 0.0000% |
| | A5 | 7.00 | 2.06 | 0.0309 | 0.0001 | 0.0033% | 0.0002 | 0.0004% |
| | A10 | 4.48 | 3.83 | 0.0689 | 0.0002 | 0.0040% | 0.0002 | 0.0003% |
| | A15 | 1.10 | 1.31 | 0.0000 | 0.0000 | 0.0000% | 0.0000 | 0.0000% |
| | A20 | 0.27 | 1.13 | 0.0825 | 0.0002 | 0.0161% | 0.0000 | 0.0001% |
| | A25 | 0.16 | 0.71 | 0.0000 | 0.0000 | 0.0000% | 0.0000 | 0.0000% |
| | A30 | 0.09 | 0.46 | 0.0000 | 0.0000 | 0.0000% | 0.0000 | 0.0000% |
| | A35 | 0.21 | 0.46 | 0.0000 | 0.0000 | 0.0000% | 0.0000 | 0.0000% |
| | A45 | 0.80 | 0.46 | 0.0000 | 0.0000 | 0.0000% | 0.0000 | 0.0000% |
| | A60 | 0.98 | 0.7 | 0.0014 | 0.0000 | 0.0004% | 0.0000 | 0.0000% |
| | A75 | 0.89 | 0.7 | 0.0014 | 0.0000 | 0.0004% | 0.0000 | 0.0000% |
| | A90 | 0.69 | 0.7 | 0.0014 | 0.0000 | 0.0004% | 0.0000 | 0.0000% |
| TOTALS | | 19.49 | — | — | — | — | 0.0005 | 0.0008% |

Retention and Seepage Effectiveness Calculations
Setup: Diamond Sock Inlet Filter System (IFS) & 6% Sediment Concentration Soil Loam
Date: Jan. 27, 2016 Event 1 Start: 10:18 AM Stop: 11:48 AM

| Sample Number | Test Time minutes | Soil Gradations measured | Total Weight g | Decanted Weight, g | Dry Weight, g | Bottle Weight, g | Dry Sediment Weight, mg | Total Collected Water Wt., g |
|---|---|---|---|---|---|---|---|---|
| Upstream | | X | | | | | | |
| B0 | 0 | O | 396.58 | 189.44 | 171.31 | 150.54 | 20770 | 225.27 |
| B5 | 5 | O | 398.67 | 185.80 | 169.08 | 149.40 | 19680 | 229.59 |
| B10 | 10 | O | 401.81 | 183.94 | 166.27 | 149.20 | 17070 | 235.54 |
| B15 | 15 | O | 396.31 | 174.44 | 164.77 | 150.64 | 14130 | 231.54 |
| B20 | 20 | O | 396.32 | 168.99 | 163.87 | 152.25 | 11620 | 232.45 |
| B25 | 25 | O | 392.40 | 166.60 | 158.91 | 150.90 | 8010 | 233.49 |
| B30 | 30 | O | 369.90 | 159.99 | 154.99 | 150.45 | 4540 | 214.91 |
| Water Added To Mixer (lbs): 3760 | | | | | Soil Added To Mixer (lbs): 240 | | | |
| Downstream | | | | | | | | |
| A0 | 0 | X | 352.69 | 151.10 | 146.72 | 145.16 | 1560 | 205.97 |
| A5 | 5 | X | 331.24 | 154.45 | 149.53 | 147.47 | 2060 | 181.71 |
| A10 | 10 | X | 348.01 | 156.59 | 152.64 | 150.81 | 1830 | 195.37 |
| A15 | 15 | X | 372.04 | 155.94 | 152.05 | 150.74 | 1310 | 219.99 |
| A20 | 20 | X | 372.60 | 152.37 | 148.68 | 147.55 | 1130 | 223.92 |
| A25 | 25 | X | 385.90 | 154.72 | 151.44 | 150.73 | 710 | 234.46 |
| A30 | 30 | X | 375.92 | 154.02 | 151.34 | 150.88 | 460 | 224.58 |
| A35 | 35 | O | 386.38 | 155.00 | 151.74 | 151.04 | 700 | 234.64 |
| A45 | 45 | O | 377.12 | 156.07 | 150.45 | 149.46 | 990 | 226.67 |
| A60 | 60 | X | 371.54 | 150.39 | 146.68 | 145.81 | 870 | 224.86 |
| A75 | 75 | O | 358.62 | 155.03 | 151.85 | 151.14 | 710 | 206.77 |
| A90 | 90 | O | 353.04 | 155.15 | 152.90 | 151.62 | 1280 | 200.14 |
| Soil Collected (lbs): n/a | | | | | | | | |
| Soil Retention Effectiveness = 91.88% | | | | Seepage Effectiveness = 68.15% | | | | |

While the invention has been shown in several particular embodiments it should be clear that various modifications may be made to the present invention without departing from the spirit and scope thereof. The scope of the present invention is defined by the appended claims and equivalents thereto.

What is claimed is:

1. An above grate based inlet filter system for erosion and sediment control comprising a filter mat configured to be coupled to a grate, a securing mechanism configured to securing the filter mat to the grate, and wherein the mat includes an array of flow holes extending into the mat from a top surface thereof, wherein the mat includes filtering plugs in a plurality of the flow holes.

2. The erosion and sediment control filter system according to claim 1 wherein the filtering plugs are formed of 100% reticulated polyether foam.

3. The erosion and sediment control filter system according to claim 1 wherein the filter mat is formed of looped vinyl strands of PVC material bonded together in random looping patterns.

4. The erosion and sediment control filter system according to claim 3 wherein the filter mat includes beveled edges.

5. The erosion and sediment control filter system according to claim 3 wherein the filter mat is at least 2 inches thick.

6. The erosion and sediment control filter system according to claim 3 wherein the mat includes filtering plugs in a plurality of the flow holes.

7. The erosion and sediment control filter system according to claim 1 wherein the securing mechanism configured to securing the filter mat to the grate includes magnets.

8. The erosion and sediment control filter system according to claim 7 wherein the magnets are formed of Neodymium magnetic sheet material.

9. An above grate based inlet filter system for erosion and sediment control comprising a high traffic filter mat formed of looped strands of PVC material bonded together in random looping patterns, at least one magnet configured to securing the filter mat to the grate, and at least one flow hole extending into the mat from a top surface thereof.

10. The erosion and sediment control filter system according to claim 9 wherein the mat includes a plurality of flow holes through the mat.

11. The erosion and sediment control filter system according to claim 9 wherein the mat includes at least one filtering plug within a flow hole.

12. The erosion and sediment control filter system according to claim 11 wherein each filtering plug is formed out of foam.

13. The erosion and sediment control filter system according to claim 9 wherein the mat around the perimeter of the grate is beveled.

14. An above grate based inlet filter system for erosion and sediment control comprising a filter mat configured to extend at least to the perimeter of the grate, a securing mechanism configured to securing the filter mat around the perimeter of the grate, wherein the mat includes at least one removable dewatering plug configured to allow for selective mat bypass.

15. The erosion and sediment control filter system according to claim 14 wherein multiple side edges of the mat extending from a top surface of the mat to a bottom surface of the mat are undulating having a pattern of repeating recesses.

16. The erosion and sediment control filter system according to claim 15 wherein the mat includes a plurality of high flow holes through the mat and closed at a bottom surface.

17. The erosion and sediment control filter system according to claim 16 wherein the filter mat is formed of vertically aligned coir fibers and is at least 2 inches thick, and has a density of at least 35 oz/ft$^3$.

18. The erosion and sediment control filter system according to claim 17 further including a filter berm which is triangular in cross section and is formed of 100% reticulated polyether foam and is at least 3" in height.

19. The erosion and sediment control filter system according to claim 16 wherein the filter mat is formed of reticulated polyether foam.

* * * * *